United States Patent [19]
Wakefield

[11] Patent Number: 5,729,115
[45] Date of Patent: Mar. 17, 1998

[54] APPARATUS AND METHOD FOR IDENTIFYING AND CHARGING BATTERIES OF DIFFERENT TYPES

[75] Inventor: Ivan Nelson Wakefield, Cary, N.C.

[73] Assignee: Ericsson Inc., RTP, N.C.

[21] Appl. No.: 664,277

[22] Filed: Jun. 11, 1996

[51] Int. Cl.[6] .......................... H01M 10/44; H01M 10/46
[52] U.S. Cl. .......................... 320/2; 320/6; 320/15
[58] Field of Search .......................... 320/2, 5, 6, 15, 320/32, 48; 429/96, 97, 98, 99, 100

[56] References Cited

U.S. PATENT DOCUMENTS

| | | | |
|---|---|---|---|
| 3,763,434 | 10/1973 | Blesch et al. | 455/349 |
| 4,214,197 | 7/1980 | Mann et al. | 320/2 |
| 4,382,220 | 5/1983 | Marshall et al. | 320/2 |
| 4,816,735 | 3/1989 | Cook et al. | 320/2 |
| 4,963,812 | 10/1990 | Mischenko et al. | 320/2 |
| 5,148,094 | 9/1992 | Parks et al. | 320/2 |
| 5,157,318 | 10/1992 | Wang | 320/2 |
| 5,164,652 | 11/1992 | Johnson et al. | 320/2 |
| 5,184,059 | 2/1993 | Patino et al. | 320/15 |
| 5,187,422 | 2/1993 | Izenbaard et al. | 320/2 |
| 5,200,686 | 4/1993 | Lee | 320/2 |
| 5,237,257 | 8/1993 | Johnson et al. | 320/2 |
| 5,245,266 | 9/1993 | Yuen | 320/2 |
| 5,280,229 | 1/1994 | Faude et al. | 320/2 |
| 5,332,957 | 7/1994 | Lee | 320/2 |
| 5,350,993 | 9/1994 | Toya et al. | 320/2 |
| 5,357,185 | 10/1994 | Chen | 320/2 |
| 5,365,159 | 11/1994 | Chen | 320/15 |
| 5,455,499 | 10/1995 | Uskali et al. | 320/43 |
| 5,460,901 | 10/1995 | Syrjälä | 429/90 |
| 5,471,128 | 11/1995 | Patino et al. | 320/13 |
| 5,485,073 | 1/1996 | Kasashima et al. | 320/15 |
| 5,576,610 | 11/1996 | Patino et al. | 320/31 |

FOREIGN PATENT DOCUMENTS

| | | |
|---|---|---|
| 112586 | 6/1984 | Japan. |
| 237439 | 9/1990 | Japan. |
| 139128 | 6/1991 | Japan. |
| 006938 | 1/1994 | Japan. |

OTHER PUBLICATIONS

IBM Technical Disclosure Bulletin "Battery Type Indicator" vol. 35, No. 4A, Sep. 1992, pp. 449–450.

IBM Technical Disclosure Bulletin "Distinction between Rechargeable Battery and Dry Battery" vol. 37, No. 09 Sep. 1994, pp. 37–38.

Patent Abstract of Japan, "Charger" by Kawada Takeshi et al., Publication No. 01169880, Jul. 1989.

Patent Abstract of Japan, "Portable Radio Communication Equipment" by Ishikura Akira, Publication No. 05218942, Aug. 27, 1993.

Patent Abstract of Japan "Battery Voltage Display Circuit of Portable Type Electronic Equipment" by Kitamura Shigeki, Publication No. 05323002, Dec. 7, 1993.

*Primary Examiner*—Adolf Berhane
*Assistant Examiner*—Patrick B. Law

[57] ABSTRACT

An apparatus for charging batteries of different types is disclosed as including support means for receiving a battery having a positive terminal and a negative terminal, a battery interface for electrically coupling the battery charging apparatus to the received battery, and a circuit for identifying the particular type of the received battery and supplying a charging current to the received battery in accordance with a specified charging algorithm applicable to the particular battery type. The battery interface includes a positive contact positioned within the support means so as to engage the positive terminal of the received battery, a negative contact positioned within the support means so as to engage the negative terminal of the received battery, and at least one sensing contact positioned within the support means which senses a voltage from the received battery indicative of a particular battery type. The circuit identifies the particular battery type by whether or not the sensing contact is engaged by one of the battery terminals, by whether the voltage sensed by the sensing contact is substantially equivalent or not to a voltage received by one of the battery terminals, by whether the voltage sensed by the sensing contact creates a high or low logic level in the circuit, or by which combination of logic pins is engaged by the battery terminals.

49 Claims, 6 Drawing Sheets

APPARATUS AND METHOD FOR IDENTIFYING AND CHARGING BATTERIES OF DIFFERENT TYPES

BACKGROUND OF THE INVENTION

1. Field of the Invention

The present invention relates generally to the charging of batteries and, in particular, to an apparatus and method for identifying batteries of different types and adapting the manner in which such batteries are charged in accordance therewith.

2. Description of Related Art

The use of rechargeable batteries to power electronic devices is well known and desirable in order to minimize cost and maximize use of resources. For example, such batteries have been utilized extensively with handheld mobile telephones and other radio communication equipment among other items. In an effort to maximize the length of time a battery is able to provide adequate power between chargings, several different types of rechargeable batteries have been and are continuing to be developed. This includes batteries made of different materials, such as nickel cadmium, nickel metal hydride, and lithium. Because each type of rechargeable battery has an optimum manner in which it should be charged, it is desirable for a charger to be tailored for each one instead of providing current in the same manner. This requires the charging apparatus to be able to identify the type of battery and provide the charging current in a manner preferred for such battery type.

Several chargers exist for providing charge to batteries of different sizes, shapes, and capacities (e.g., U.S. Pat. No. 5,365,159 to Chen, U.S. Pat. No. 5,357,185 to Chen, U.S. Pat. No. 5,280,229 to Faude et al., U.S. Pat. No. 5,245,266 to Yuen, U.S. Pat. No. 5,157,318 to Wang, U.S. Pat. No. 5,148,094 to Parks et al., U.S. Pat. No. 4,963,812 to Mischenko et al., and U.S. Pat. No. 4,816,735 to Cook et al.). While these chargers appear to be useful for their intended purpose, they do not have the ability to distinguish between batteries of substantially the same size and shape which are made of different materials.

In order to accomplish this task, other charging apparatuses have been disclosed that identify different types of batteries by means of sensing circuits therein which receive certain information from the battery. Examples of this kind of charger are described in U.S. Pat. No. 5,350,993 to Toya et al., U.S. Pat. No. 5,200,686 to Lee, U.S. Pat. No. 5,184,059 to Patino et al., and Japanese Patent 402237439 to Kudo. These chargers, however, tend to overcomplicate the process and increase cost for both the charger and the associated battery.

Thus, it would be preferred for the charger and battery to be physically configured so as to enable easy identification of the battery type and proper application of the applicable charging process therefor. One attempt in this regard is disclosed by Japanese Patent 406006938 to Yamazaki in which a multiple-battery charger is described which has a number of positive terminals located at different positions and a separate terminal for monitoring the temperature of one battery type.

U.S. Pat. No. 5,332,957 to Lee discloses a battery module and charger design which is utilized to identify different battery types. In this patent, the battery includes a plurality of discrete electrodes in which one such electrode is electrically uncoupled or coupled in a fashion redundant with respect to one of the other electrodes. The particular electrode chosen for each battery type is different to enable identification by the charger.

Although the description of related art has focused on battery chargers and the manner in which they identify batteries of different types, it should be recognized that this is only one area in which battery identification is desirable. Other components (and their functions) in electronic devices oftentimes rely upon or affect the electrical characteristics of a particular battery type, such as circuitry in communication devices relating to transmitter power level and length of transmission. Accordingly, the present invention is concerned with identification of battery types in general, as well as with battery charging devices specifically.

In light of the foregoing, a primary objective of the present invention is to provide an apparatus having the ability to identify different types of batteries.

Another object of the present invention is to provide an apparatus having the ability to charge different types of rechargeable batteries.

A further object of the present invention is to provide an apparatus having the ability to charge different types of rechargeable batteries according to charging algorithms particularly applicable thereto.

Yet another object of the present invention is to provide an apparatus having the ability to charge rechargeable batteries of different capacities.

Still another object of the present invention is to provide a handheld mobile telephone including an apparatus which is able to identify and charge different types of rechargeable batteries.

Another object of the present invention is to provide a handheld mobile telephone including an apparatus which automatically identifies the type of battery connected thereto.

A further object of the present invention is to provide a battery charger accessory having the ability to identify and charge different types of rechargeable batteries.

An object of the present invention is to provide an interface between a handheld mobile telephone and a battery pack which permits the use of different batteries.

Yet another object of the present invention is to provide an interface between a handheld mobile telephone and a battery pack which automatically identifies the type of battery therein so that it may be charged according to a particular charging algorithm applicable thereto.

Another object of the present invention is to provide a method of identifying the type of battery to be charged and adapting the manner in which the battery is charged in response thereto.

These objects and other features of the present invention will become more readily apparent upon reference to the following description when taken in conjunction with following drawing.

SUMMARY OF THE INVENTION

In accordance with one aspect of the present invention, an apparatus for charging batteries of different types is disclosed as including support means for receiving a battery having a positive terminal and a negative terminal, a battery interface for electrically coupling the battery charging apparatus to the received battery, and a circuit for identifying the particular type of the received battery and supplying a charging current to the received battery in accordance with a specified charging algorithm applicable to the particular battery type. The battery interface includes a positive contact positioned within the support means so as to engage the positive terminal of the received battery, a negative contact positioned within the support means so as to engage the negative terminal of the received battery, and at least one sensing contact positioned within the support means which senses a voltage from the received battery indicative of a particular battery type. The circuit identifies the particular battery type by whether or not the sensing contact is engaged by one of the battery terminals, by whether the voltage sensed by the sensing contact is substantially equivalent or not to a voltage received by one of the battery terminals, by whether the voltage sensed by the sensing contact creates a high or low logic level in the circuit, or by which combination of logic pins is engaged by the battery terminals.

In accordance with a second aspect of the present invention, a battery pack for a handheld mobile telephone is disclosed as including a housing, a battery positioned within the housing, and an interface for electrically coupling the battery to a battery interface in the handheld mobile telephone having a positive contact, a negative contact, and a sensing contact. The interface of the battery further includes a positive terminal connected to the battery at a first end and a negative terminal connected to the battery at a second end, wherein the type of battery positioned within the housing is distinguished by means of a voltage sent to the sensing contact by the interface of the battery.

In a third aspect of the present invention, a handheld mobile telephone is disclosed as including a main housing, a signal processing circuit located within the main housing for operating the handheld mobile telephone in a particular mode of communication, a battery pack attached to the main housing for powering the handheld mobile telephone, an interface for electrically coupling the battery pack with the signal processing circuit, the interface including at least one sensing contact for sensing a voltage from the battery pack indicative of a particular battery type, and circuitry associated with the signal processing circuit for identifying the particular type of battery pack. The handheld mobile telephone may also include circuitry associated with the signal processing circuit for charging the battery pack in accordance with a particular charging algorithm applicable to the electrical characteristics of the battery pack.

In accordance with a fourth aspect of the present invention, a method of charging different types of batteries in an apparatus according to a charging algorithm applicable thereto is disclosed. The method includes the steps of: providing each battery with an interface indicative of the particular battery type, the interface including a positive terminal and a negative terminal; electrically coupling the battery interface to the apparatus; sensing a specified voltage from the battery interface; identifying the particular type of battery from the specified voltage received from the battery interface; and, supplying a charging current to the battery in accordance with a charging algorithm applicable to the particular type of the battery.

In accordance with a fifth aspect of the present invention, an apparatus for identifying different types of batteries is disclosed as including a positive contact positioned so as to engage a positive terminal of a battery, a negative contact positioned so as to engage a negative terminal of the battery, at least one sensing contact which senses a voltage from the battery indicative of a particular battery type, and a microcomputer connected to the positive, negative and sensing contacts which identifies the particular battery type of the battery from the sensed voltage.

BRIEF DESCRIPTION OF THE DRAWING

While the specification concludes with claims particularly pointing out and distinctly claiming the present invention, it is believed the same will be better understood from the following description taken in conjunction with the accompanying drawing in which:

DETAILED DESCRIPTION OF THE INVENTION

Figure 1:
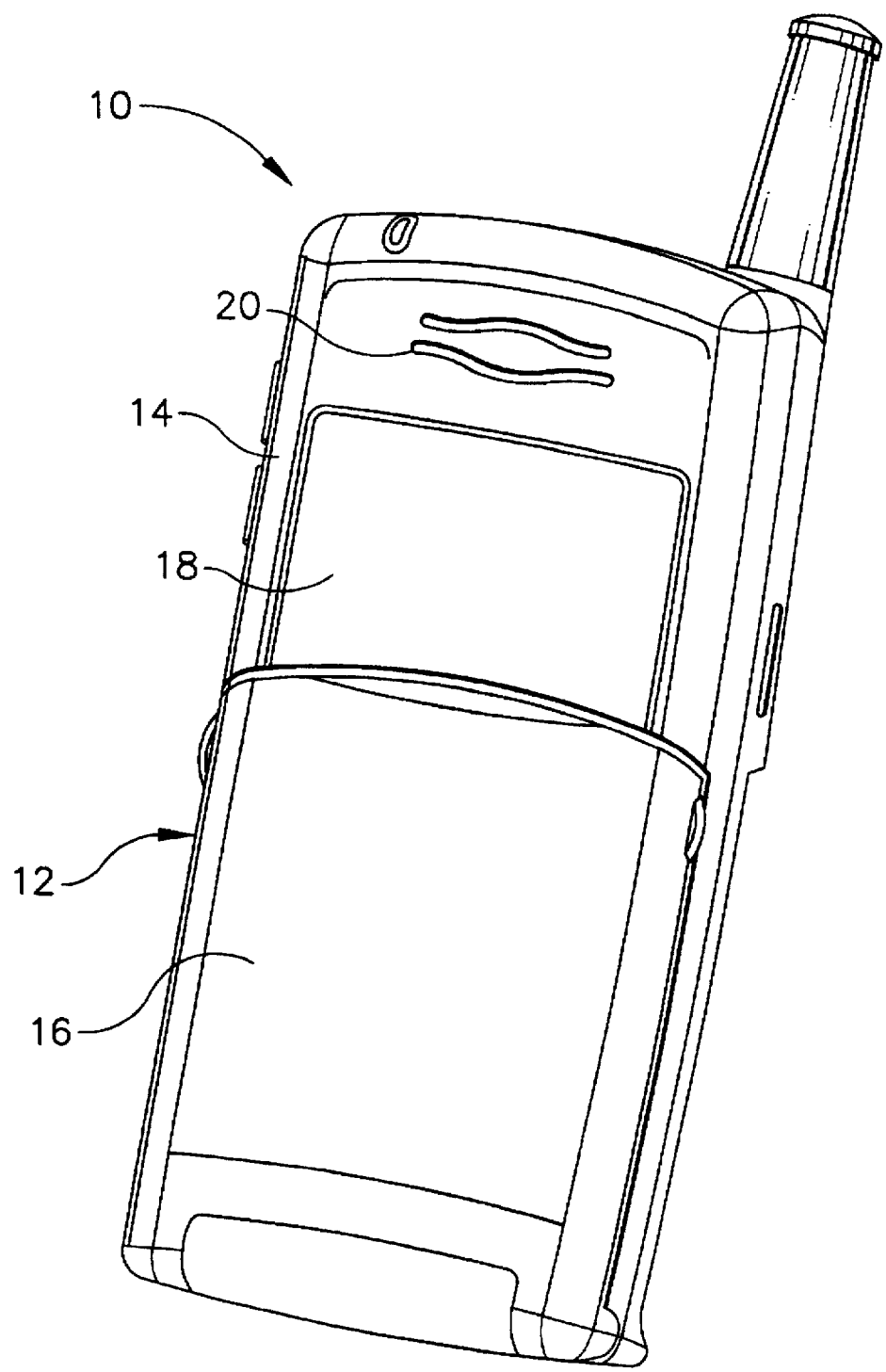
FIG. 1 is a front perspective view of a handheld mobile telephone including a battery identification and charging apparatus in accordance with the present invention.

Referring now to the drawing in detail, wherein identical numerals indicate the same elements throughout the figures, FIG. 1 depicts a handheld mobile telephone 10 including a battery identification and charging apparatus in accordance with the present invention. In particular, it will be seen that handheld mobile telephone 10 includes a main housing 12, in which a top surface 14 thereof offers access to a keypad (not shown) behind a cover 16, a display 18, and a speaker 20. While not shown, handheld mobile telephone 10 further includes signal processing circuitry within main housing 12 for operating it in a designated mode of communication.

Figure 2:
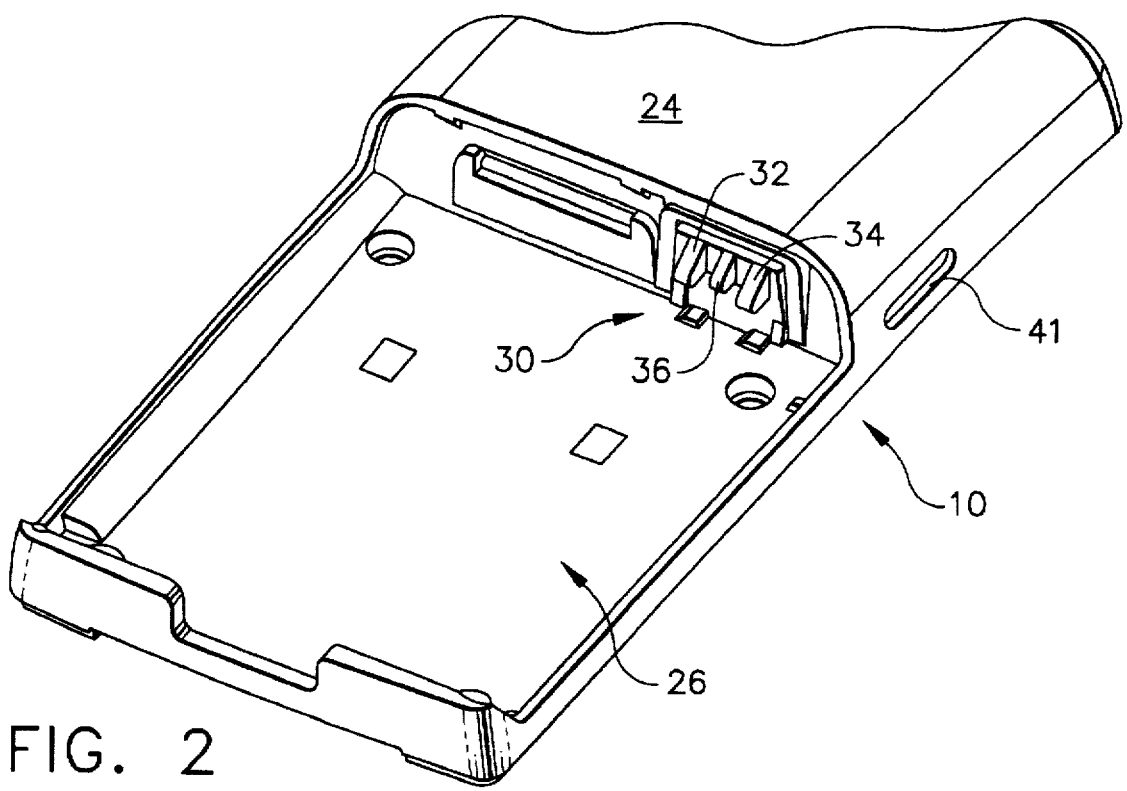
FIG. 2 is a partial rear perspective view of the handheld mobile telephone depicted in FIG. 1, where the battery pack has been removed for clarity.

As best seen in FIG. 2, a rear surface 24 of main housing 12 has a cavity 26 in which a battery pack 28 of compatible shape and size may be positioned to power handheld mobile telephone 10. Battery pack 28 is not shown in FIG. 2 in order to see an interface 30 located in cavity 26 which is provided to electrically couple battery pack 28 with handheld mobile telephone 10. More specifically, interface 30 includes a first contact 32, a second contact 34, and a third contact 36, where first contact 32 is preferably a positive contact positioned so as to engage a positive terminal of battery pack 28 and second contact 34 is preferably a negative contact positioned so as to engage a negative terminal of battery pack 28. It will be seen in FIGS. 4 and 7 that first contact 32 is utilized to receive the voltage from battery pack 28 and second contact 34 is utilized as ground (although the respective functions of these contacts may be reversed).

In accordance with the present invention, third contact 36 is utilized in a first embodiment as a sensing contact. Preferably, third contact 36 is positioned adjacent first contact 32 so that the particular type of battery in battery pack 28 can be identified by whether the positive terminal of battery pack 28 contacts both first and third contacts 32 and 36, respectively, or only first contact 32. Of course, third contact 36 could be positioned adjacent second contact 34 so that the type of battery in battery pack 28 could be identified in like manner by whether the negative terminal of battery pack 28 contacts both second and third contacts 34 and 36, respectively, or only second contact 34. It will be understood that additional sensing contacts may be provided with interface 30 to increase the number of battery types that may be identified. This is because the maximum number of battery types $B_{max}$ which can be identified through interface 30 is equivalent to the number of sensing contacts as a power of two (i.e., $B_{max}=2^x$ where x is the number of sensing contacts).

It will be understood that different types of batteries may be utilized in battery pack 28, including those made of nickel metal hydride, lithium (e.g., liquid lithium ion and plastic lithium ion), and alkaline. The nickel metal hydride and lithium battery types are rechargeable, but each has a preferred manner of charging for optimum usage. Further, such batteries may be configured to have different voltage capacities. In the handheld mobile telephone environment, however, the batteries will generally provide a voltage in the range of approximately three to approximately four volts. Also, while the positive terminals for each battery pack 28 will preferably be positioned in substantially the same location, it is recognized that different locations for such positive terminals may be provided for each battery type if desired (which would necessitate additional positive contacts being provided for interface 30).

Figure 4:
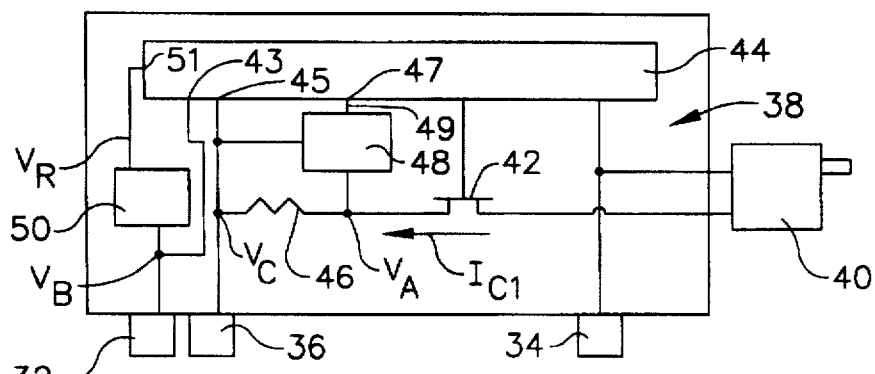
FIG. 4 is a schematic diagram depicting a first embodiment of the battery identification and charging apparatus of the present invention which may be utilized in the handheld mobile telephone and battery charger accessory shown in FIGS. 1–3.
Figure 7:
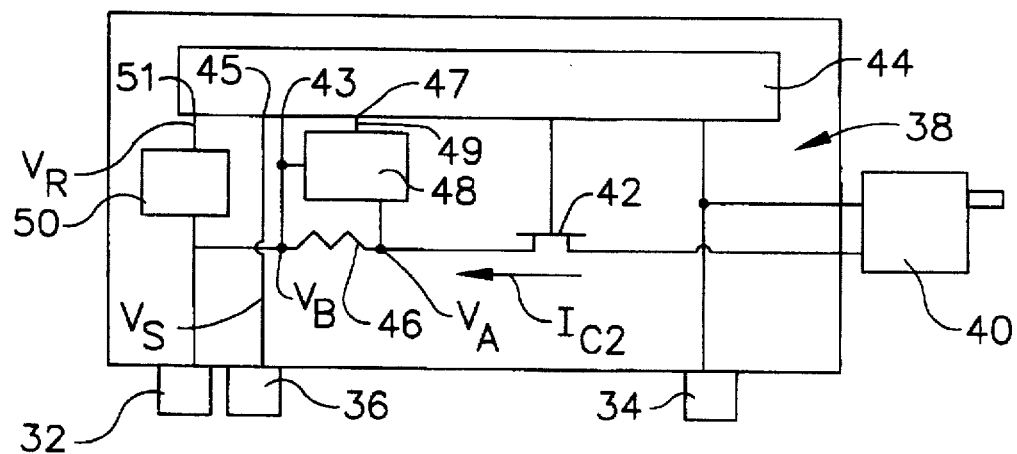
FIG. 7 is a schematic diagram depicting a second embodiment of the battery identification and charging apparatus of the present invention.

It is highly desirable that handheld mobile telephone 10 include circuitry, indicated generally by the numeral 38 in FIGS. 4 and 7, which would enable battery pack 28 to be charged when positioned within cavity 26. In particular, charging circuitry 38 would preferably be associated with the signal processing circuit and provide current to battery pack 28 for charging in accordance with a specified charging algorithm applicable to the particular battery type therein and the electrical characteristics thereof. While charging circuitry 38 may provide a direct path between battery pack 28 and a current source 40 (e.g., an AC/DC adapter from an ordinary wall outlet connected to a complementary slot 41 in handheld mobile telephone 10), it is preferred that a switching device 42 (such as a field effect transistor) be positioned between current source 40 and third contact 36 to better vary the charging process.

A microcomputer 44 or other similar printed circuit module in handheld mobile telephone 10 contains the various charging algorithms for the different battery types and is therefore responsible for the opening and closing of switching device 42 in this embodiment. Microcomputer 44 is also utilized to identify the particular battery type in battery pack 28, as described in greater detail below.

With respect to the first embodiment, it will be understood from FIGS. 4 and 5A–5C that microcomputer 44 reads voltages $V_B$ and $V_C$ received at first contact 32 and third contact 36, respectively, to determine battery type. Voltage $V_B$ is provided to microcomputer 44 at an input 43 and voltage $V_C$ is provided to microcomputer 44 at an input 45. Thus, voltages $V_B$ and $V_C$ will be the same for the nickel metal hydride battery shown in FIG. 5A independent of the state of charging circuitry 38 since they are both received from positive terminal 58A of battery 54A. Voltage $V_B$ for the lithium battery shown in FIG. 5B will be relatively constant and independent of voltage $V_C$ since they are received from different terminals (positive terminal 58B and charging terminal 62B, respectively) on battery 54B; thus, switching device 42 is able to vary voltage $V_C$ therein. Because the alkaline battery depicted in FIG. 5C does not have a separate charging terminal and positive terminal 58C thereof does not engage third terminal 36, microcomputer 44 is able to determine that it is not a rechargeable battery (i.e., no current is measured when a high voltage $V_C$ provided).

Figure 5A:
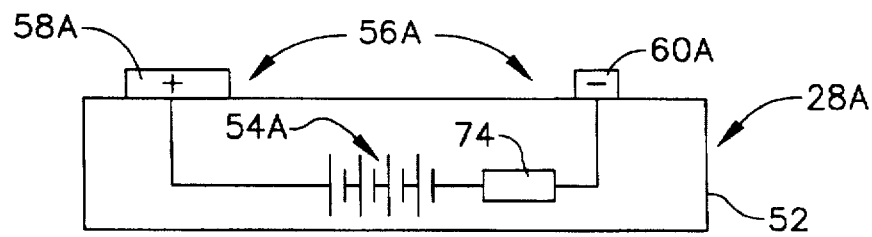
FIG. 5A is a schematic diagram of a battery pack receivable in the handheld mobile telephone of FIGS. 1–2 and the battery charger accessory of FIG. 3 including a first type of battery.
Figure 5B:
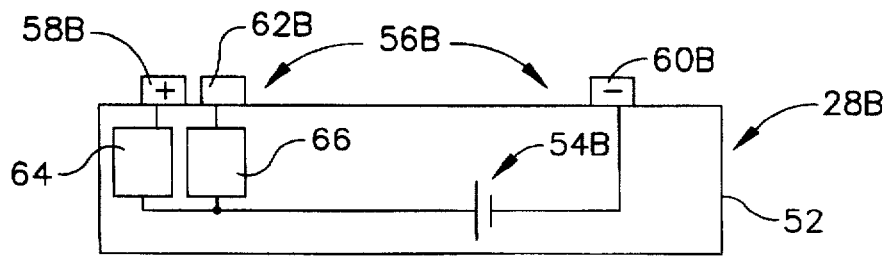
FIG. 5B is a schematic diagram of a battery pack receivable in the handheld mobile telephone of FIGS. 1–2 and the battery charger accessory of FIG. 3 including a second type of battery.
Figure 5C:
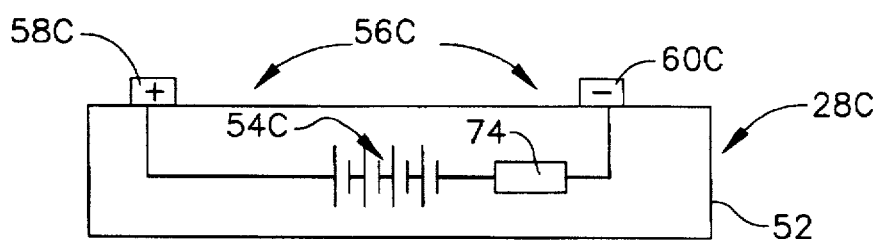
FIG. 5C is a schematic diagram of a battery pack receivable in the handheld mobile telephone of FIGS. 1–2 and the battery charger accessory of FIG. 3 including a third type of battery.
Figure 5D:
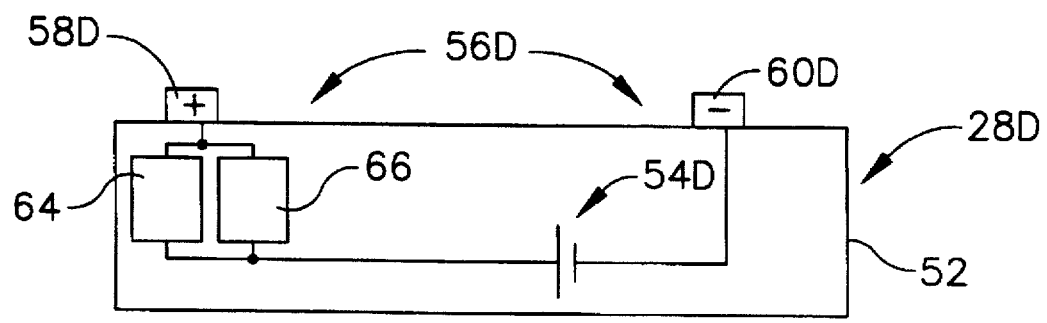
FIG. 5D is a schematic diagram of a battery pack receivable in the handheld mobile telephone of FIGS. 1–2 and the battery charger accessory of FIG. 3 of the battery type depicted in FIG. 5B having an alternative configuration.

For the rechargeable batteries of FIG. 5A and 5B, it will be understood that switching device 42 is modulated by microcomputer 44 at a specified frequency to provide the level of charging current, indicated by arrow $I_{C1}$, required for rapid charging or trickle charging as desired. Charging current $I_{C1}$ is monitored by microcomputer 44 to verify that it is in accordance with the particular charging algorithm being utilized. This is accomplished by reading the voltage drop across a load 46 in the form of a resistor (preferably on the order of 0.10 Ohm). The voltage upstream of load 46 (i.e., between switching device 42 and load 46) is designated as $V_A$ and the voltage downstream of load 46 (i.e., between load 46 and third contact 36) is voltage $V_C$. It will be noted that a differential amplifier 48 is preferably located within charging circuitry 38 and receives voltages $V_A$ and $V_C$ at the inputs thereof to add gain so that the difference therebetween (represented by an output 49 of differential amplifier 48) sent to input 47 of microcomputer 44 is at a level which permits monitoring of charging current $I_{C1}$.

A voltage regulator 50 is preferably provided between first contact 32 and an input 51 to microcomputer 44 in order to provide a regulated voltage $V_R$ as a power supply to microcomputer 44. Voltage regulator 50 is also utilized to terminate charging of battery pack 28 when battery voltage $V_B$ reaches a specified level. Microcomputer 44 will preferably include analog-to-digital converters at each of inputs 43, 45, and 47 to convert signals representing voltage $V_B$, voltage $V_C$, and the difference of voltages $V_A$ and $V_C$, respectively, from first contact 32, third contact 36 and output 49 of differential amplifier 48.

With respect to battery pack 28, it will be seen in FIGS. 5A–D and 6A–C that it includes a housing 52, a battery 54 positioned within housing 52, and an interface 56 for electrically coupling battery 54 to handheld mobile telephone 10. Interface 56 includes a positive terminal 58 connected to battery 54 at a first end and a negative terminal 60 connected to battery 54 at a second end. The type of battery 54 positioned within housing 52 is distinguished by means of a predetermined feature of interface 56. This predetermined feature preferably relates to the size of either positive terminal 58 or negative terminal 60, where such terminal has a different size depending on battery type. As described above, one of these terminals 58/60 contacts only its corresponding contact 32/34 on interface 30 of handheld mobile telephone 10 for one type of battery and third contact 36 in addition thereto for a second type of battery.

Figure 6A:
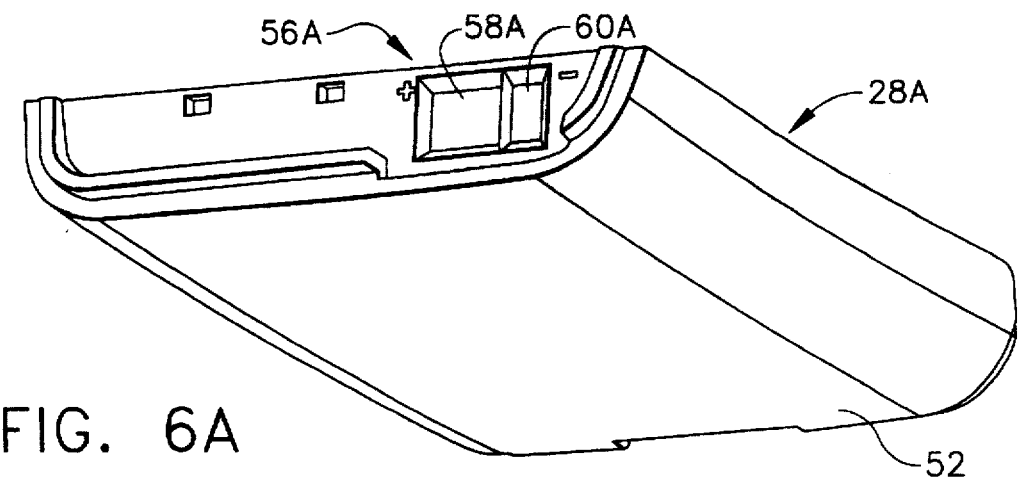
FIG. 6A is a perspective view of the battery pack shown in FIG. 5A.
Figure 6B:
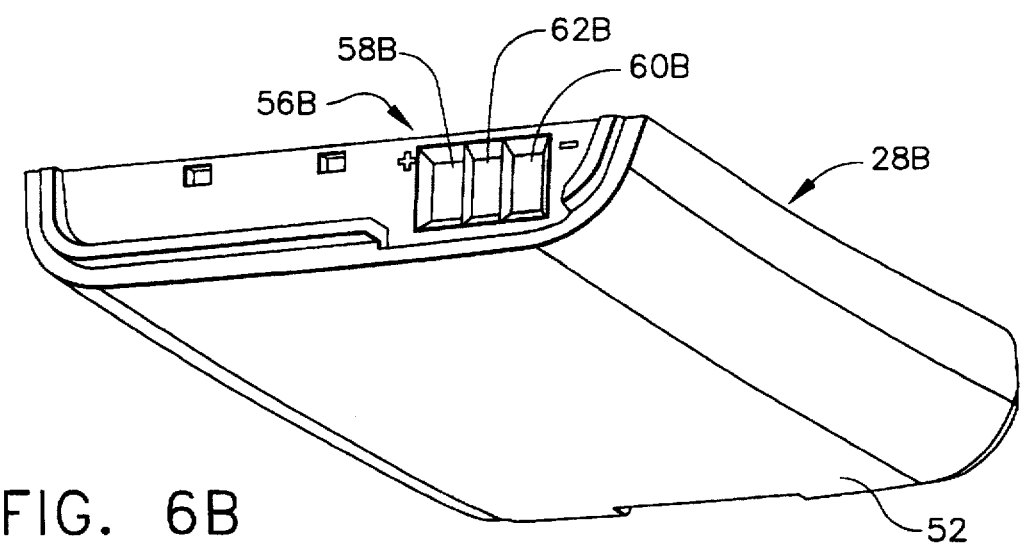
FIG. 6B is a perspective view of the battery pack shown in FIG. 5B.
Figure 6C:
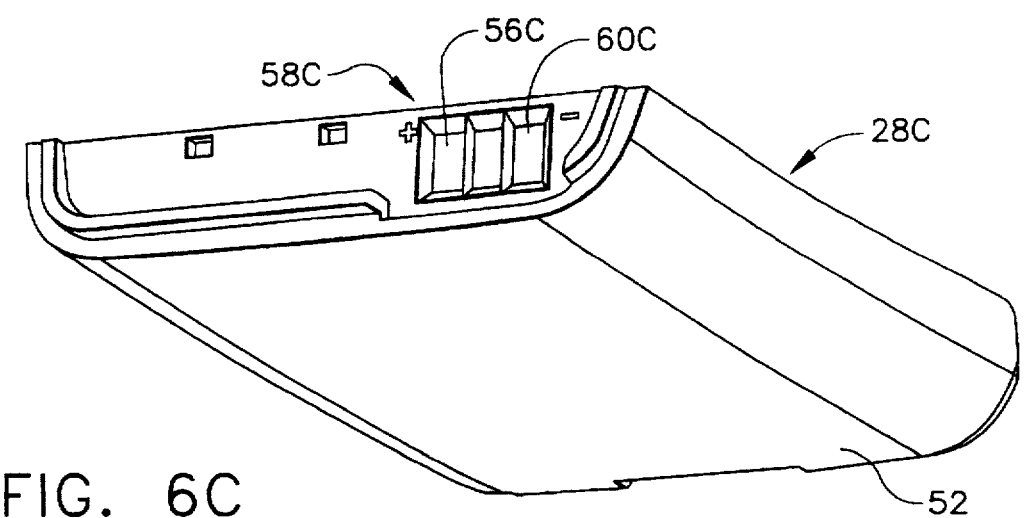
FIG. 6C is a perspective view of the battery pack shown in FIG. 5C.

With regard to the lithium type of battery pack 28, as seen in FIGS. 5B and 6B, it has been noted that a charging terminal 62B separate from positive terminal 58B may be provided which aligns with third contact 36 of interface 30. In this way, not only can the voltage signal from battery pack 28B be distinguished, but separate voltage safety and charge safety circuits 64 and 66 may be provided in series within battery pack 28. Otherwise, voltage safety circuit 64 and charge safety circuit 66 will be arranged in parallel and connected to positive terminal 58D when no separate charging terminal is provided (see FIG. 5D).

A second embodiment of charging circuitry 38, as shown in FIG. 7, involves third contact 36 receiving a sensing voltage $V_S$ from battery pack 28. While charging circuitry 38 remains generally the same, it will be noted that the voltage downstream of load 46 is battery voltage $V_B$ instead of the voltage received at third terminal 36. This is because sensing voltage $V_S$ is connected only to input 45 of microcomputer 44 and not to the circuit including switching device 42. Therefore, microcomputer 44 reads sensing voltage $V_S$ to determine battery type and the voltage drop across load 46 (voltage $V_A$ minus voltage $V_B$) to determine charge current $I_{C2}$. For example, sensing voltage $V_S$ may have a high logic level for the nickel metal hydride battery of FIG. 5A (where positive terminal 58A thereof engages third contact 36 in addition to first contact 32) and a low logic level for the lithium battery of FIG. 5B (where positive terminal 58B thereof engages only first contact 32). Charge current measurement and modulation is otherwise the same as described above with respect to the first embodiment.

Figure 8A:
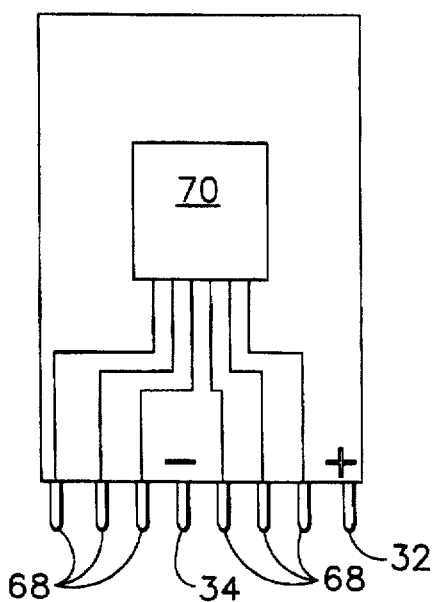
FIG. 8A is a schematic diagram of a third embodiment of the battery identification and charging apparatus of the present invention.
Figure 8B:
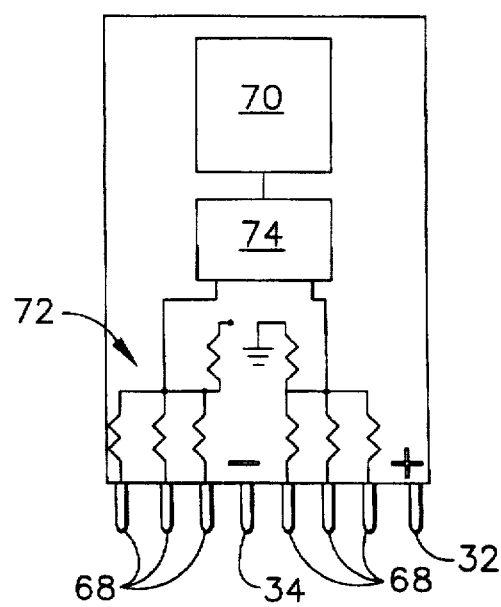
FIG. 8B is a schematic diagram of an alternative to the third embodiment of the battery identification and charging apparatus depicted in FIG. 8A.
Figure 9A:
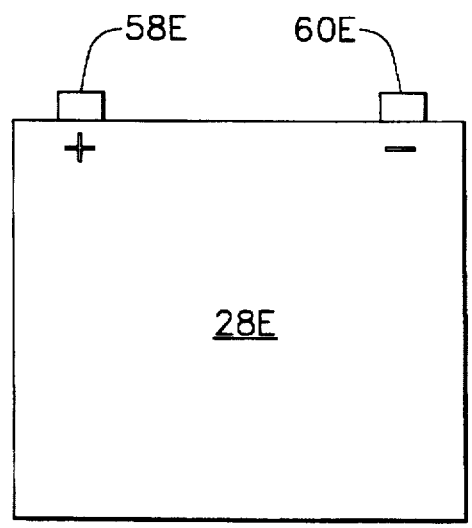
FIG. 9A is a schematic diagram of a battery pack having a configuration compatible with the battery identification and charging apparatus shown in FIGS. 8A and 8B.
Figure 9B:
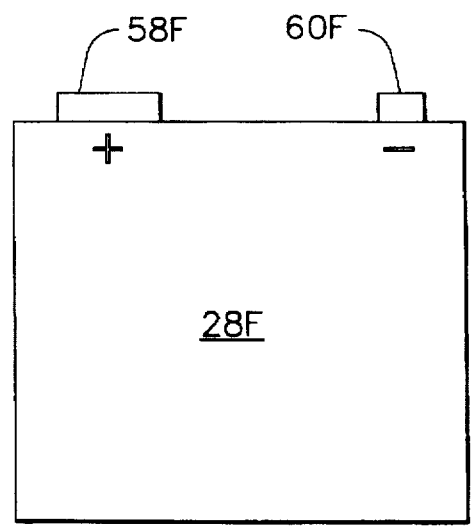
FIG. 9B is a schematic diagram of a battery pack having a configuration compatible with the battery identification and charging apparatus shown in FIGS. 8A and 8B.

Further, a third embodiment of charging circuitry 38 is depicted in FIGS. 8A and 8B as utilizing one or more logic pins 68 for third contact 36 in interface 30. Battery pack 28, for its part, then has a different configuration for each battery type (see FIGS. 9A and 9B) so that the particular type of battery 54 therein is identified from the combination of logic pins 68 engaged by battery pack 28. Such engagement preferably occurs by means of different sizes and locations of positive terminal 58 and/or negative terminal 60. This identification is accomplished directly by a logic circuit 70, as seen in FIG. 8A, which may include a microcomputer like that discussed above. Alternatively, identification can be made by forming a digital-to-analog resistor ladder 72 in association with logic pins 68 and including an analog-to-digital converter 74 at an input of logic circuit 70 (see FIG. 8B).

It will be understood that charging circuitry 38 and battery pack 28 are designed to provide a method of charging different types of batteries 54 housed in battery pack 28. The steps of such method include providing each battery 54 with an interface 56 indicative of the particular battery type, electrically coupling battery interface 56 to charging circuitry 38, sensing a specified voltage from battery interface 56 by means of sensing contact 36, identifying the particular type of battery 54 from the specified voltage received from battery interface 56, and supplying a charging current $I_C$ to battery 54 from charging circuitry 38 in accordance with the applicable charging algorithm for such battery type. As noted herein, the size of positive or negative terminals 58 or 60, respectively, of battery pack 28 will preferably dictate the particular type of battery 54 therein. This is accomplished by determining whether the specified voltage is substantially equivalent to a voltage received at either the positive or negative contacts 32 or 34, whether the specified voltage from battery pack 28 creates a high or low logic level in charging circuit 38, or by the combination of logic pins 68 engaged by battery pack 28. In each case, microcomputer 44 or another logic circuit in charging circuitry 38 is used to identify the type of battery 54 in battery pack 28 and implement the applicable charging algorithm thereto.

Figure 3:
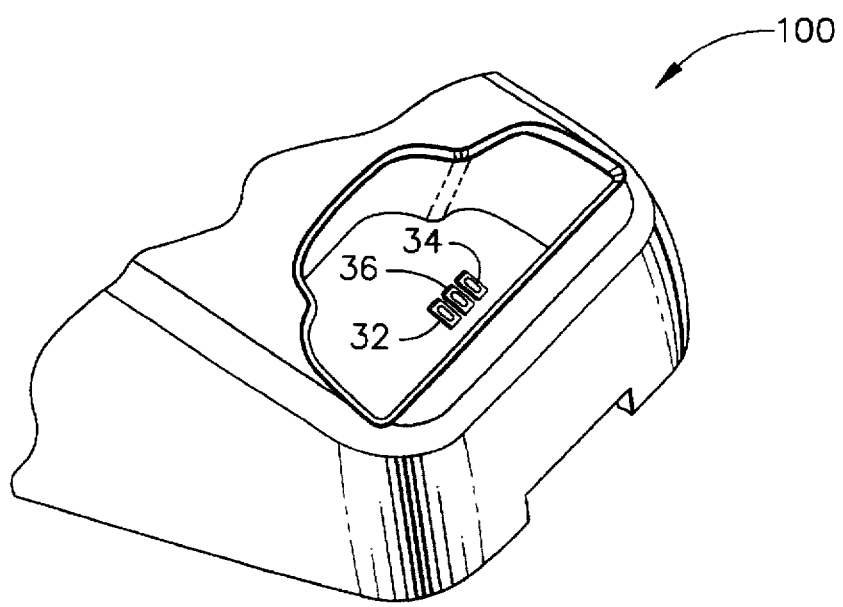
FIG. 3 is a partial perspective view of a battery charger accessory including the battery identification and charging apparatus in accordance with the present invention.

Having shown and described the preferred embodiment of the present invention, further adaptations of the apparatus and method for charging different types of batteries can be accomplished by appropriate modifications by one of ordinary skill in the art without departing from the scope of the invention. For example, the charging circuitry described herein may be incorporated in handheld mobile telephone 10 or in a battery charger accessory 100 such as the desk charger depicted in FIG. 3.

What is claimed is:

1. An apparatus for charging batteries of different types, comprising:
   (a) a support for receiving a battery having a positive terminal and a negative terminal;
   (b) a battery interface for electrically coupling said battery charging apparatus to said received battery, further comprising:
      (1) a positive contact positioned within said support so as to engage said positive terminal of said received battery;
      (2) a negative contact positioned within said support so as to engage said negative terminal of said received battery; and
      (3) at least one sensing contact positioned within said support; and
   (c) a circuit for identifying the particular type of said received battery by whether said positive terminal of said received battery contacts said sensing contact in addition to said positive contact and supplying a charging current to said received battery in accordance with a specified charging algorithm applicable to the particular battery type identified.

2. The battery charging apparatus of claim 1, wherein the particular type of said received battery is among a group consisting of nickel cadmium, nickel metal hydride, and lithium.

3. The battery charging apparatus of claim 1, wherein said sensing contact senses a voltage from said received battery and said circuit identifies the particular type of said received battery by whether said sensed voltage is substantially equivalent to a voltage received by said positive contact.

4. The battery charging apparatus of claim 1, said battery interface comprising more than one positive contact.

5. The battery charging apparatus of claim 1, wherein the maximum number of battery types which can be identified by said circuit is a function of the number of sensing contacts as a power of two.

6. The battery charging apparatus of claim 1, said received battery having a voltage in the range of approximately three to approximately four volts.

7. The battery charging apparatus of claim 1, said circuit providing a direct charge path between a current source and said received battery.

8. The battery charging apparatus of claim 1, said circuit further comprising:
   (a) a current source connected to said negative contact and said sensing contact; and
   (b) a switching device positioned between said current source and said sensing contact.

9. The battery charging apparatus of claim 8, said circuit further comprising a microcomputer containing said charging algorithms, wherein said charging algorithms control the opening and closing of said switching device.

10. The battery charging apparatus of claim 9, said circuit further comprising a voltage regulator positioned between said positive contact and said microcomputer.

11. The battery charging apparatus of claim 8, said circuit further comprising a load positioned between said switching device and said sensing contact, wherein a first voltage is defined upstream of said load and a second voltage is defined downstream of said load, said charging current being a function of the difference between said first and second voltages.

12. The battery charging apparatus of claim 1, wherein said battery charging apparatus is incorporated into a handheld mobile telephone.

13. The battery charging apparatus of claim 1, wherein said battery charging apparatus is incorporated into a battery charger accessory.

14. The apparatus of claim 1, said support means being configured to receive only batteries of substantially similar size and shape.

15. An apparatus for charging batteries of different types, comprising:
(a) a support for receiving a battery having a positive terminal and a negative terminal;
(b) a battery interface for electrically coupling said battery charging apparatus to said received battery, further comprising:
(1) a positive contact positioned within said support so as to engage said positive terminal of said received battery;
(2) a negative contact positioned within said support so as to engage said negative terminal of said received battery; and
(3) at least one sensing contact positioned within said support; and
(c) a circuit for identifying the particular battery type by whether said negative terminal of said received battery contacts said sensing contact in addition to said negative contact and supplying a charging current to said received battery in accordance with a specified charging algorithm applicable to the particular battery type identified.

16. The battery charging apparatus of claim 15, wherein said sensing contact senses a voltage from said received battery and said circuit identifies the particular type of said received battery by whether said sensed voltage is substantially equivalent to a voltage received by said negative contact.

17. The battery charging apparatus of claim 15, said circuit further comprising:
(a) a current source connected to said negative contact and said positive contact; and
(b) a switching device positioned between said current source and said positive contact.

18. The battery charging apparatus of claim 17, said circuit further comprising a microcomputer containing said charging algorithms, wherein said charging algorithms control the opening and closing of said switching device.

19. The battery charging apparatus of claim 18, said circuit further comprising a voltage regulator positioned between said positive contact and said microcomputer.

20. The battery charging apparatus of claim 17, said circuit further comprising a load positioned between said switching device and said positive contact, wherein a first voltage is defined upstream of said load and a second voltage is defined downstream of said load, said charging current being a function of the difference between said first and second voltages.

21. An apparatus for charging batteries of different types, comprising:
(a) a support for receiving a battery having a positive terminal and a negative terminal;
(b) a battery interface for electrically coupling said battery charging apparatus to said received battery, further comprising:
(1) a positive contact positioned within said support so as to engage said positive terminal of said received battery;
(2) a negative contact positioned within said support so as to engage said negative terminal of said received battery; and
(3) at least one logic pin located within said support adjacent said positive and negative contacts; and
(c) a logic circuit for identifying the particular type of said received battery from each logic pin engaged by said received battery and supplying a charging current to said received battery in accordance with a specified charging algorithm applicable to the particular battery type identified.

22. The battery charging apparatus of claim 21, each of said logic pins having a resistor connected thereto to form a digital-to-analog ladder, wherein said logic circuit includes an analog-to-digital converter connected to said resistor ladder at an input so as to determine the particular battery type from said resistor ladder.

23. A battery pack for a handheld mobile telephone, comprising:
(a) a housing;
(b) a battery positioned within said housing; and
(c) an interface for electrically coupling said battery to a battery interface in said handheld mobile telephone having a positive contact, a negative contact, and a sensing contact, said interface further comprising:
(1) a positive terminal connected to said battery at a first end; and
(2) a negative terminal connected to said battery at a second end;
wherein the type of battery positioned within said housing is distinguished by means of the size and location of at least one of said positive and negative terminals.

24. The battery pack of claim 23, wherein said positive terminal engages said sensing contact in addition to said positive contact.

25. The battery pack of claim 24, wherein a voltage sent to said sensing contact from said positive terminal creates a high logic level in said handheld mobile telephone.

26. The battery pack of claim 23, wherein said positive terminal engages only said positive contact.

27. The battery pack of claim 26, wherein the lack of a voltage being sent to said sensing contact from said positive terminal creates a low logic level in said handheld mobile telephone.

28. The battery pack of claim 23, wherein said negative terminal engages said sensing contact in addition to said negative contact.

29. The battery pack of claim 23, wherein said negative terminal engages only said negative contact.

30. The battery pack of claim 23, wherein said battery has a voltage in the range of approximately three to approximately four volts.

31. The battery pack of claim 23, further comprising a fuse positioned between said battery second end and said negative terminal.

32. The battery pack of claim 31, further comprising a protection circuit located between said fuse and said negative terminal to prevent said battery from exceeding a specified temperature and voltage.

33. The battery pack of claim 23, said interface further comprising a charging terminal.

34. The battery pack of claim 33, further comprising a charge safety circuit positioned between said charging terminal and said battery first end.

35. The battery pack of claim 23, further comprising a voltage protection circuit positioned between said positive terminal and said battery first end.

36. The battery pack of claim 35, further comprising a charge safety circuit positioned between said positive terminal and said battery first end, wherein said charge safety circuit and said voltage safety circuit are connected in parallel.

37. The battery pack of claim 23, wherein said battery is rechargeable.

38. The battery pack of claim 37, wherein said battery is among a group comprised of nickel cadmium, nickel metal hydride, and lithium.

39. A handheld mobile telephone, comprising:
   (a) a main housing;
   (b) a signal processing circuit located within said main housing for operating said handheld mobile telephone in a particular mode of communication;
   (c) a battery pack attached to said main housing for powering said handheld mobile telephone, said battery pack including a positive terminal and a negative terminal;
   (d) an interface for electrically coupling said battery pack with said signal processing circuit, said interface including:
      (1) a positive contact positioned so as to engage said positive terminal of said battery pack;
      (2) a negative contact positioned so as to engage said negative terminal of said battery pack; and
      (3) at least one sensing contact; and
   (e) circuitry associated with said signal processing circuit for identifying the particular type of battery in said battery pack from whether said positive and/or negative terminal of said battery pack engages said sensing contact in addition to said positive and negative contacts, respectively.

40. The handheld mobile telephone of claim 39, further comprising circuitry associated with said signal processing circuit for charging said battery pack in accordance with a particular charging algorithm applicable to the electrical characteristics of said identified type of battery in said battery pack.

41. A method of charging different types of batteries in an apparatus according to a charging algorithm applicable thereto, said method comprising the following steps:
   (a) providing each battery with an interface having a positive terminal and a negative terminal sized and positioned so as to be indicative of the particular battery type;
   (b) electrically coupling said battery interface to said apparatus;
   (c) determining whether one of said positive and negative terminals engages a sensing contact in addition to its respective contact on said apparatus;
   (d) identifying the particular type of said battery from the engagement of said sensing contact by said positive and negative terminals; and
   (e) supplying a charging current to said battery in accordance with a charging algorithm applicable to the particular type of said battery identified.

42. The method of claim 41, wherein the size of one of said positive and negative terminals is indicative of the particular battery type.

43. The method of claim 42, wherein each of said batteries is substantially the same size and shape other than said positive and negative terminals thereof.

44. A method of charging different types of batteries in an apparatus according to a charging algorithm applicable thereto, said method comprising the following steps:
   (a) providing each battery with an interface having a positive terminal and a negative terminal sized and positioned so as to be indicative of the particular battery type;
   (b) electrically coupling said battery interface to said apparatus;
   (c) determining which logic pins located on said apparatus are engaged by said positive and negative terminals in addition to its respective contact on said apparatus;
   (d) identifying the particular type of said battery from the combination of logic pins engaged by said positive and negative terminals of said battery; and
   (e) supplying a charging current to said battery in accordance with a charging algorithm applicable to the particular type of said battery identified.

45. An apparatus for identifying batteries of different types, comprising:
   (a) a positive contact positioned so as to engage a positive terminal of a battery;
   (b) a negative contact positioned so as to engage a negative terminal of said battery;
   (c) at least one sensing contact; and
   (d) a microcomputer connected to said positive, negative, and sensing contacts, wherein said microcomputer identifies the particular type of said battery by whether a voltage received by said sensing contact is substantially equivalent to a voltage received by one of said positive and negative contacts.

46. The apparatus of claim 45, wherein the particular type of said battery is among a group consisting of nickel cadmium, nickel metal hydride, and lithium.

47. The apparatus of claim 45, said microcomputer identifying the particular type of said battery by a logic level created by said voltage received at said sensing contact.

48. A method of identifying different types of batteries, comprising the following steps:
   (a) providing each battery with an interface including a positive terminal and a negative terminal;
   (b) electrically coupling said battery interface to a microcomputer by means of a positive contact, a negative contact, and a sensing contact;
   (c) sensing a voltage received by said sensing contact from said battery interface; and
   (d) identifying the particular type of said battery from whether the voltage received by said sensing contact is substantially equivalent to a voltage received by one of said positive and negative contacts.

49. The method of claim 48, said identifying step further comprising determining whether said specified voltage creates a high or low logic level in said microcomputer.

* * * * *